(12) United States Patent
Chang

(10) Patent No.: US 8,320,095 B2
(45) Date of Patent: Nov. 27, 2012

(54) TRANSFORMER MODULE WITH MULTIPLE PROTECTIONS

(76) Inventor: Nai-Chien Chang, New Taipei (TW)

(*) Notice: Subject to any disclaimer, the term of this patent is extended or adjusted under 35 U.S.C. 154(b) by 0 days.

(21) Appl. No.: 13/112,067

(22) Filed: May 20, 2011

(65) Prior Publication Data

US 2012/0008239 A1 Jan. 12, 2012

(30) Foreign Application Priority Data

Jul. 6, 2010 (TW) ................................ 99212853 U

(51) Int. Cl.
*H02H 3/22* (2006.01)
(52) U.S. Cl. ........................................................ 361/119
(58) Field of Classification Search .................... 361/119
See application file for complete search history.

(56) References Cited

U.S. PATENT DOCUMENTS

| | | | | |
|---|---|---|---|---|
| 4,161,008 | A * | 7/1979 | Zimmermann et al. | 361/56 |
| 4,577,255 | A * | 3/1986 | Martin | 361/119 |
| 5,796,781 | A * | 8/1998 | DeAndrea et al. | 375/288 |
| 7,524,206 | B2 * | 4/2009 | Gutierrez et al. | 439/607.01 |
| 7,944,668 | B2 * | 5/2011 | Huang et al. | 361/111 |
| 8,155,012 | B2 * | 4/2012 | Austermann et al. | 370/241 |
| 2004/0257743 | A1 * | 12/2004 | Chen et al. | 361/119 |
| 2008/0037192 | A1 * | 2/2008 | Huang et al. | 361/118 |
| 2009/0207538 | A1 * | 8/2009 | Crawley et al. | 361/56 |
| 2010/0295646 | A1 * | 11/2010 | Harrison et al. | 336/192 |
| 2011/0026178 | A1 * | 2/2011 | Luo et al. | 361/91.1 |
| 2011/0267725 | A1 * | 11/2011 | Scuderi et al. | 361/56 |

* cited by examiner

*Primary Examiner* — Ronald W Leja
(74) *Attorney, Agent, or Firm* — Chun-Ming Shih; HDLS IPR Services

(57) ABSTRACT

The transformer module of the invention includes an isolation transformer having a primary winding with a first tap and a secondary winding with a second tap. A protection circuit is electrically connected to the first tap and the second tap. The protection circuit includes at least one protective element.

8 Claims, 3 Drawing Sheets

TRANSFORMER MODULE WITH MULTIPLE PROTECTIONS

BACKGROUND OF THE INVENTION

1. Technical Field

The invention relates to transformers, particularly to transformers for connectors.

2. Related Art

A connector is installed in an electric device for connecting an external device via a cable. However, once a cable has been connected to a connector, the connector even the electric devices connected by the cable may be damaged by transient overvoltage on the cable.

A network cord, which is a typical example of such a cable, is usually disposed outside a building without covering. Surges tend to occur on a network cord because of lightening. Such surges may cause damage to electric devices. Thus, some network connectors are equipped with a surge reduction element to prevent electric devices from being damaged by surges.

FIG. 1 is a circuit diagram of lightening protection in a conventional connector. The connector is arranged with an isolation transformer 10. The surges or electromagnetic interference (EMI) occurs at the primary winding 101 will be isolated by the isolation transformer 10 so as to prevent an electric device (not shown) connected to the secondary winding 102 from being damaged by the surges or EMI. However, the isolation transformer 10 can exclude most of the disruptive energy, but its secondary winding may still generate surges. Therefore, the electric device cannot be completely protected only by the isolation transformer.

As a result, a surge absorber 20 such as a transient voltage suppressor (TVS) must be further disposed at the two terminals 1011, 1012 of the primary winding 101 or the secondary winding 102. The surge absorber 20 can reduce overvoltage from the isolation transformer 10. However, a specific connector can be installed in various electric devices and various electric devices with different specifications usually have different safety requirements. The above-mentioned structure is disadvantageous to change of the surge absorber 20 in a connector. As a result, when the surge absorber 20 needs to be changed into another one, the only solution is to change a whole connector with a different surge absorber. Only changing the surge absorber 20 is usually unavailable. This will increase manufacturing costs.

SUMMARY OF THE INVENTION

A primary object of the invention is to provide a transformer module which has multiple protections of static electricity, lightening and EMI.

Another object of the invention is to provide a transformer module whose removable protection circuit is independently changeable.

To accomplish the above objects, the transformer module of the invention includes an isolation transformer having a primary winding with a first tap and a secondary winding with a second tap. A protection circuit is electrically connected to the first tap and the second tap. The protection circuit includes at least one protective element.

DETAILED DESCRIPTION OF THE INVENTION

Figure 1:
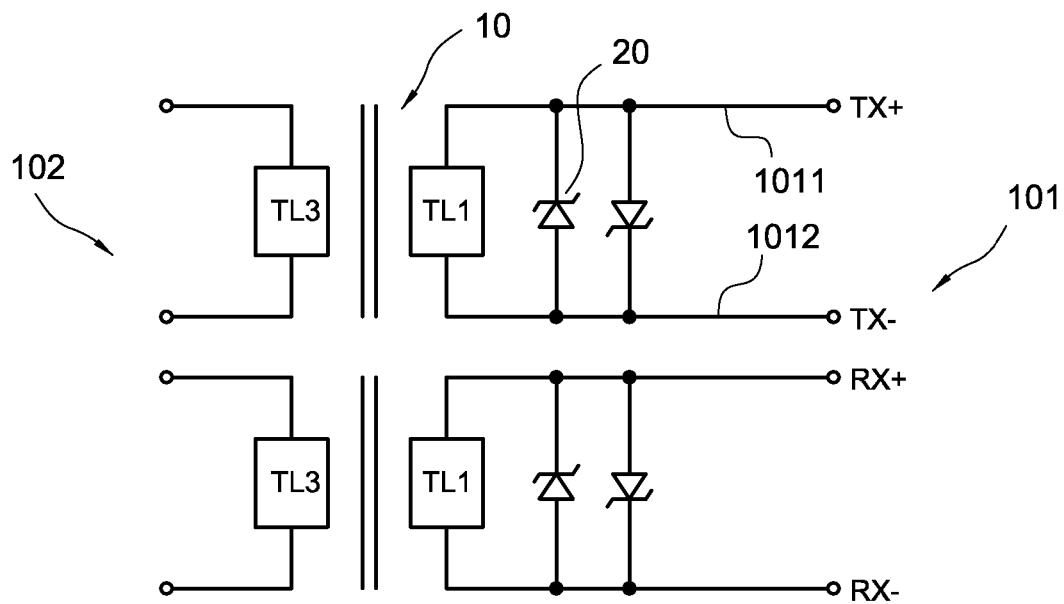
FIG. 1 is a circuit diagram of a protection of a conventional connector.
Figure 2:
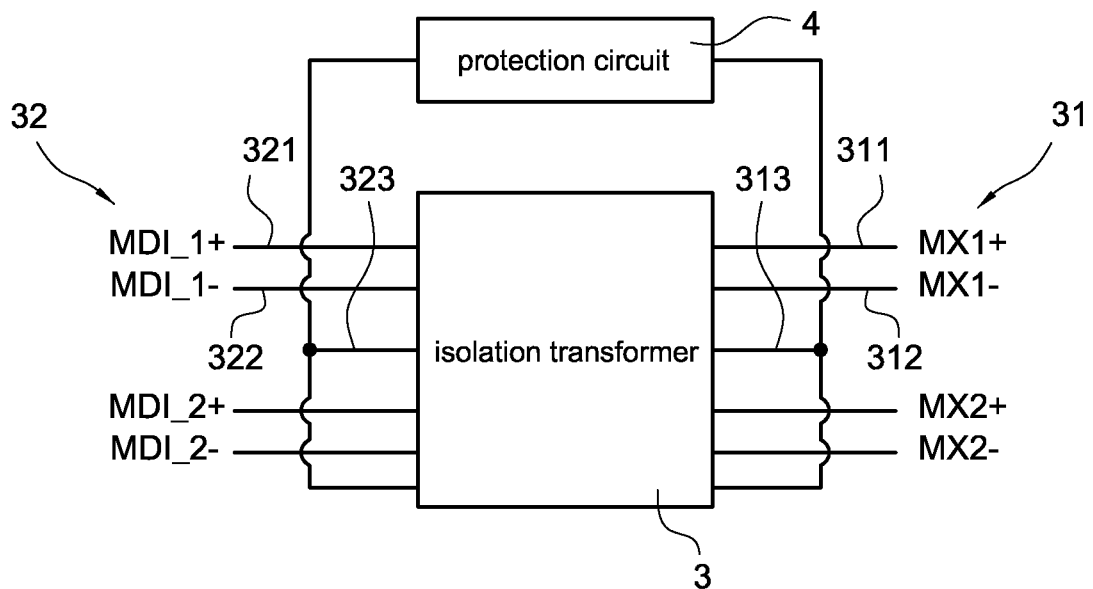
FIG. 2 is a block diagram of transformer module of the invention.

Please refer to FIG. 2. The transformer module 2 of the invention includes an isolation transformer 3 and a protection circuit 4. The isolation transformer 3 may be implemented by an integrated circuit and has a primary winding 31 and a secondary winding 32. The primary winding 31 includes a first terminal 311 and a second terminal 312 (as shown by MX1+/MX1− and MX2+/MX2− in FIG. 2). The secondary winding 32 includes a third terminal 321 and a fourth terminal 322 (as shown by MDI_1+/MDI_1− and MDI_2+/MDI_2− in FIG. 2). The primary winding 31 and secondary winding 32 are provided with a first tap 313 and a second tap 323, respectively. The protection circuit 4 is electrically connected to the two taps 313, 323 in parallel. Thereby, both the protection circuit 4 and the isolation transformer 3 constitute the transformer module 2 with multiple protections.

Figure 3:
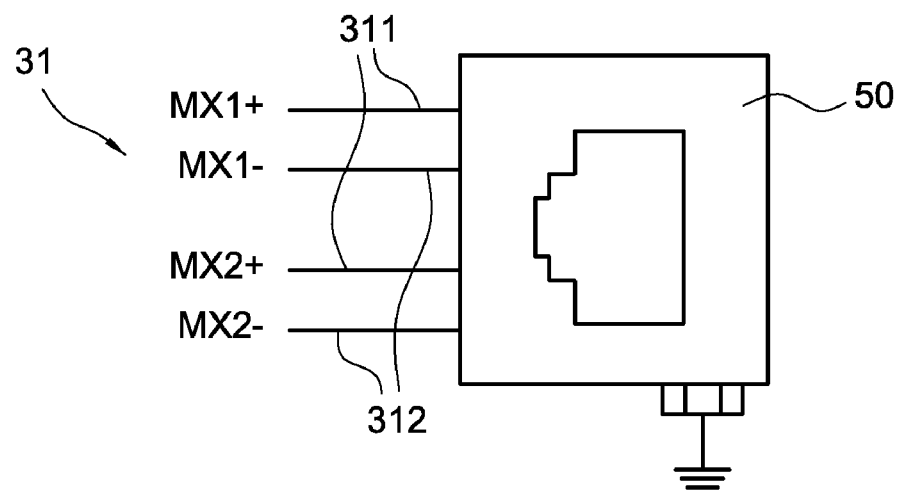
FIG. 3 is a schematic view of the connector of the invention.
Figure 4:
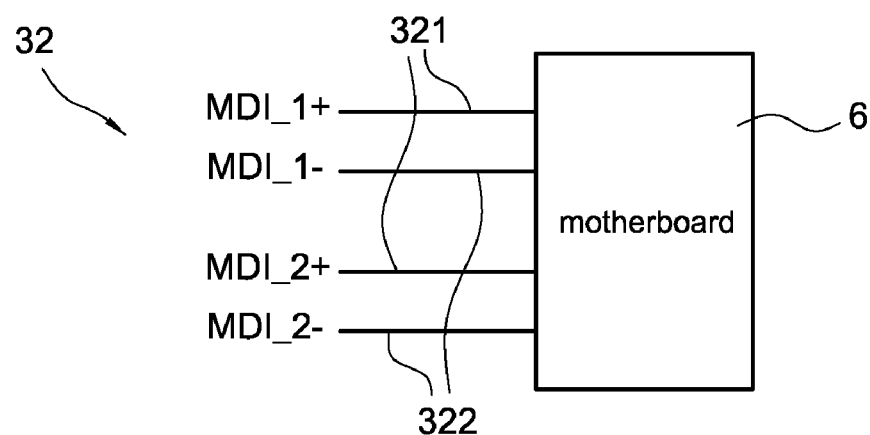
FIG. 4 is a schematic view of the invention with a motherboard.
Figure 5:
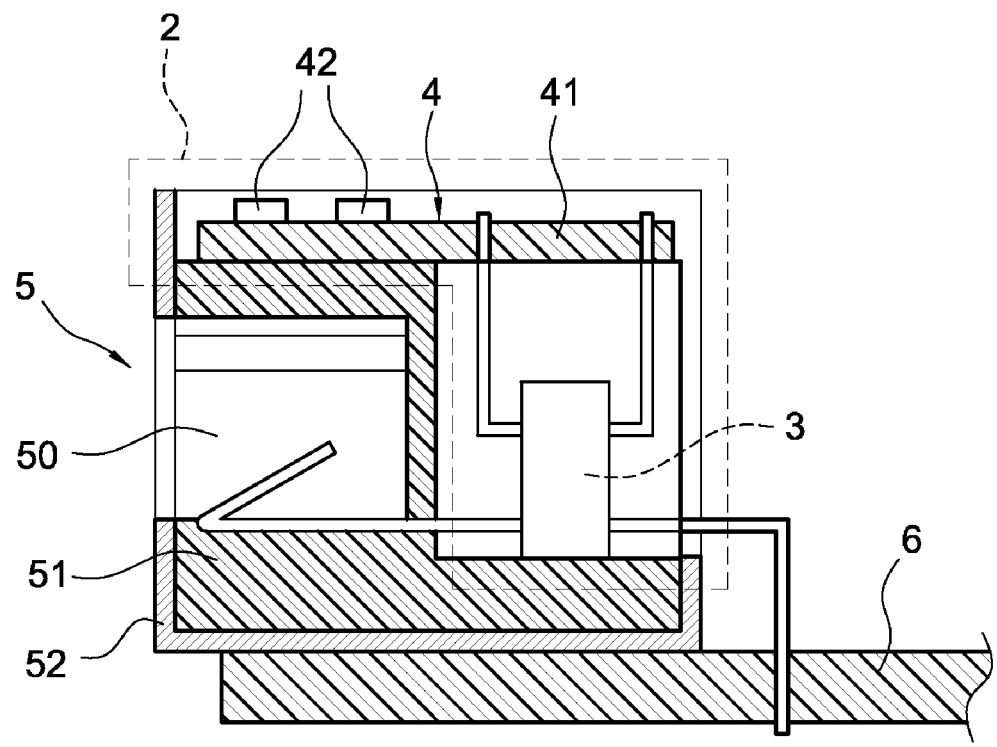
FIG. 5 is a cross-sectional view of the connector of the invention.

Please refer to FIGS. 3 and 4. When the transformer module 2 is disposed in a connector 5 as shown in FIG. 5, the first terminal 311 and the second terminal 312 of the primary winding 31 are electrically connected to a connecting aperture 50 of the connector 5. The third terminal 321 and the fourth terminal 322 of the secondary winding 32 are electrically connected to an external electric device, such as a motherboard 6. The connecting aperture 50 is used for being inserted by a cable. When a surge or EMI occurs at the primary winding 31, the transformer module 2 can attenuate or suppress them to prevent the secondary winding 32 from generating abnormal induction. Thus the motherboard 6 can be protected. The connector 5 may be, but not limited to, a network connector such as an RJ45.

Please refer to FGI. 5. The transformer module 2 is accommodated in the connector 5 and electrically connects the motherboard 6. When a surge or EMI arises from static electricity or lightening, the transformer module 2 can effectively reduce abnormal induction at the secondary winding 32.

The connector 5 includes an insulated body 51 and a metal case 52 for covering the connecting aperture 50 and the transformer module 2. The top of the insulated body 51 and metal case 52 is removable and the protection circuit 4 is located near the top of the connector 5.

The protection circuit 4 is composed of a circuit board 41 and one or more protective elements 42. The circuit board 41 is disposed above the isolation transformer 3 and electrically connects the taps 313, 323. The at least one protective element 42 is electrically connected to the isolation transformer 3. Preferably, the at least one protective element 42 is mounted on the circuit board 41 by the surface mount technology (SMT).

The protective element 42 may be a transient voltage suppressor (TVS), gas discharge tube (GDT) or capacitor. Further, the protective element 42 may also be EMI protector. The protection circuit 4 is located near and the protective element 42 is toward the top of the connector, so that the protection circuit 4 or the protective element 42 can be independently replaced with another one.

To satisfy different safety requirements, the protective element 42 may be multiple in number. The plural protective elements 4 may be two or more selected from TVSs, GDTs, capacitors and EMI protectors to be a group. For example, the group may be composed of a TVS and a GDT, capacitor or EMI protector. Also the group may adopt all of these protectors.

While the forgoing is directed to a preferred embodiment of the present invention, other and further embodiments of the invention may be devised without departing from the basic scope thereof. As such, the appropriate scope of the invention is to be determined according to the claims.

What is claimed is:

1. A transformer module comprising:
   an RJ-45 connector installed on a motherboard, having a removable top;
   an isolation transformer accommodated in the RJ-45 connector and electrically connected to the motherboard, having a primary winding with a first tap and a secondary winding with a second tap; and
   a protection circuit located near the top of the RJ-45 connector, including a circuit board disposed above the isolation transformer and electrically connected to the first tap and the second tap, and at least one protective element mounted on the circuit board and electrically connected to the isolation transformer, so that the protection circuit or the protective element can be independently replaced to meet different safety requirement of the motherboard with different specification.

2. The transformer module of claim 1, wherein the primary winding of the isolation transformer has a first terminal and a second terminal, the first terminal and the second terminal electrically connect a connecting aperture of the RJ-45 connector, the secondary winding of the isolation transformer has a third terminal and a fourth terminal, and the third terminal and the fourth terminal electrically connect the motherboard.

3. The transformer module of claim 1, wherein the at least one protective element is mounted on the circuit board by a surface mount technology (SMT).

4. The transformer module of claim 1, wherein the at least one protective element is a surge absorber.

5. The transformer module of claim 4, wherein the surge absorber is a transient voltage suppressor (TVS).

6. The transformer module of claim 4, wherein the surge absorber is a gas discharge tube (GDT).

7. The transformer module of claim 4, wherein the surge absorber is a capacitor.

8. The transformer module of claim 1, wherein the at least one protective element is an electromagnetic interference (EMI) protector.

* * * * *